United States Patent [19]

Peressini et al.

[11] 3,970,962

[45] July 20, 1976

[54] HIGH POWER ELECTRICALLY EXCITED FLOWING GAS LASER

[75] Inventors: Eugene R. Peressini, Palos Verdes Peninsula; Robert A. Hill; James M. Kallis, both of Los Angeles, all of Calif.

[73] Assignee: Hughes Aircraft Company, Culver City, Calif.

[22] Filed: Nov. 7, 1974

[21] Appl. No.: 521,715

[52] U.S. Cl. .................. 331/94.5 PE; 331/94.5 G; 330/4.3
[51] Int. Cl.² .................. H01S 3/09; H01S 3/22
[58] Field of Search .................. 331/94.5; 330/4.3

[56] References Cited
UNITED STATES PATENTS

| | | | |
|---|---|---|---|
| 3,600,704 | 2/1971 | Banas | 331/94.5 G |
| 3,842,363 | 10/1974 | Dobrzelecki | 331/94.5 G |
| 3,886,477 | 5/1975 | Ruby et al. | 331/94.5 G |

OTHER PUBLICATIONS

Brandenberg et al., IEEE J. Quantum Electronics, vol. 8, No. 4, Apr. 1972, pp. 414–418.
Plummer et al., AIAA Paper No. 73-623, AIAA 6th Fluid & Plasma Dynamics Corp., July 16–18, 1973, 8 pages.
Hill, Applied Physics Letters, 18(5), 1 Mar. 1971, pp. 194–197.
Bayless, Hughes Res. Report N00014-72-C-0496, (AD 786,745), Sept. 1974, pp. 19–25, pp. 35–44, pp. 11–13, 15–17.
Zerr, Naval Postgraduate School, Masters Thesis June 1974, AD 787,436, pp. 10–12, 24, 26, 27 & 50.

*Primary Examiner*—Robert J. Webster
*Attorney, Agent, or Firm*—Paul M. Coble; William H. MacAllister

[57] ABSTRACT

A high power, cw, high pressure, electrically excited flowing gas laser is disclosed wherein a laser excitation transverse to the direction of gas flow is initiated by a uniform electron beam perpendicular to the gas flow direction. Laser gas supplied to a plenum chamber at a pressure substantially greater than atmospheric pressure is conditioned by a perforated plate nozzle to flow through the laser cavity in a uniform stream at the desired subsonic velocity. A variable angle diffuser is provided downstream from the laser cavity to decelerate and compress the laser gas before exhausting it into the ambient atmosphere such that at the downstream end of the laser excitation region the laser gas is maintained at a pressure slightly lower than atmospheric pressure.

12 Claims, 11 Drawing Figures

HIGH POWER ELECTRICALLY EXCITED FLOWING GAS LASER

This invention relates to lasers, and more particularly relates to a high power electrically excited flowing gas laser capable of cw operation at pressures around atmospheric pressure.

In the past, high power subsonic flowing gas lasers excited by means of an electric discharge have operated either at low gas pressure (e.g., 20 Torr.) with continuous wave (cw) excitation or at high gas pressure (e.g., atmospheric pressure) with pulsed excitation.

Low pressure subsonic cw electric discharge lasers operate either with a closed cycle gas system requiring large ducting, pumps and heat exchangers or open cycle requiring large exhaust pumps. Supersonic flow devices require precise nozzles, large supersonic diffusers and heavy ducting.

In pulsed electric discharge lasers operating at atmospheric pressure, the gas medium is electrically excited with short pulses of the order of tens of microseconds. Generation of the very large pulse powers required necessitates very large and complex high voltage power conditioning equipment. This adds greatly to the overall size, weight, complexity and cost of the laser.

It is an object of the present invention to provide a high power electric discharge flowing gas laser that is smaller, lighter, less complex, more economical and operates efficiently over a wider optical bandwidth than prior art lasers of comparable power output.

It is a further object of the invention to provide a cw electrically excited flowing gas laser capable of operating at pressures around atmospheric pressure, thereby permitting open cycle operation which eliminates the need for pumps, heat exchangers, and other gas circulation equipment.

It is a still further object of the invention to provide a high power electrically excited flowing gas laser that is capable of excitation from simple and straightforward power supplies and requiring very low electron beam current densities.

In a laser according to the invention laser gas is supplied to a plenum chamber at a pressure substantially greater than atmospheric pressure. A nozzle disposed between the plenum chamber and a flow channel for the laser gas controls the flow velocity of the laser gas in the flow channel. An electron beam is introduced into an excitation region of the flow channel downstream from the nozzle in a direction perpendicular to the direction of gas flow, and a dc electric field is applied across the excitation region in a direction parallel to the direction of the electron beam to provide an electric current sufficient to excite the laser gas to a condition of population inversion. An optical resonator is provided in optical communication with the excitation region and having an optical axis passing through the excitation region in a direction perpendicular to both the gas flow and electron beam directions. A diffuser is provided in gas flow communication with the downstream end of the flow channel and with the ambient atmosphere to decelerate and compress the laser gas before exhausting it into the ambient atmosphere such that within the excitation region the laser gas is maintained at a pressure in the vicinity of atmospheric pressure.

Additional objects, advantages and characteristic features of the invention will become apparent from the following detailed description of a preferred embodiment of the invention when considered in conjunction with the accompanying drawings wherein:

Figure 1:
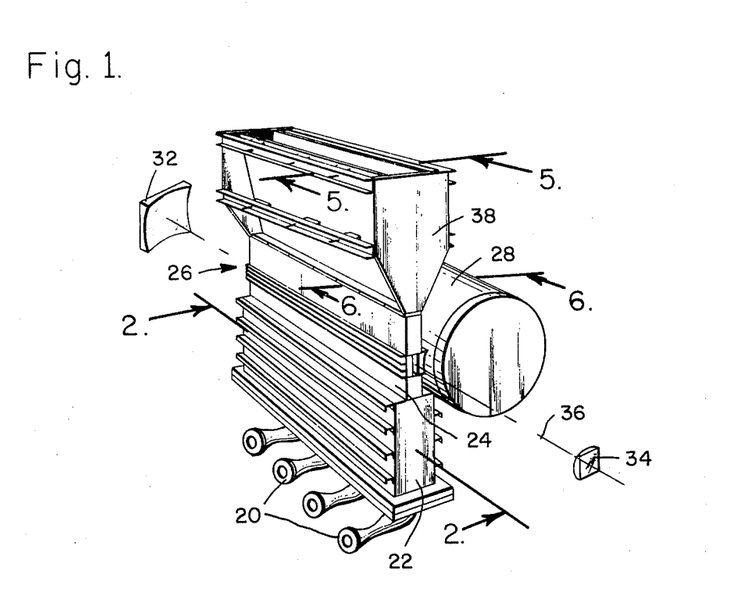
FIG. 1 is a perspective view illustrating a high power electrically excited flowing gas laser in accordance with the invention.

Referring to FIG. 1 with greater particularity, there is shown a plurality of gas supply lines 20 which supply a laser gas at high pressure to a plenum chamber 22 in which the gas is merged into a single smooth stream. An example of a specific laser gas which may be employed is a mixture of helium, nitrogen and carbon dioxide in a volume ratio of approximately 8:7:1. However, it should be understood that other gases and gas mixture ratios also may be employed.

The merged laser gas stream from the plenum chamber 22 flows through a perforated plate nozzle into a gas flow channel 24. The perforated plate nozzle will be discussed in more detail below in connection with FIGS. 2, 3 and 4b. However, for the present it should suffice to state that the perforated plate nozzle accelerates the laser gas to sonic velocity within the nozzle, and the gas reaches supersonic velocity within the flow channel 24 just downstream from the nozzle, after which it is decelerated to subsonic velocity by a series of shock waves. The resulting subsonic velocity is controllable by means of the gas pressure in the plenum chamber 22.

The laser gas then flows through an excitation region 26 where it is excited to a condition of population inversion by an electric current controlled by an electron beam generated in electron gun 28. The current is established between an anode in the form of a foil window for the electron gun 28 disposed on one side of the excitation region 26 and a cathode disposed on the opposite side of the region 26. The electrons in the electron beam and in the excitation current flow in a direction perpendicular to the gas flow direction.

An optical resonator including a pair of mirrors 32 and 34 mounted beyond opposite ends of the excitation region 26 enables the generation of a laser beam along optical axis 36 perpendicular to both the gas flow and the excitation current directions. As is shown in FIG. 1, the laser resonator may be a single pass unstable confocal resonator consisting of larger concave mirror 32 and smaller convex mirror 34, although other resonator arrangements are also suitable. Mirrors 32 and 34 may be mounted on extensions (not shown) projecting outwardly from flow channel 24 along optical axis 36, with the smaller mirror 34 mounted on struts projecting inwardly from its supporting extension. The mirrors 32 and 34 should be capable of withstanding the high optical power density which results from operation at around atmospheric pressure. Also, mirrors 32 and 34 are aligned to substantially correct for the gas density variation that occurs across the excitation region. In addition, an aerodynamic output window (not shown) may be provided externally of the mirror 34 to pressure isolate the interior of the gas flow system from the ambient atmosphere while enabling extraction of the laser output beam.

Downstream from the gas flow channel 24 the laser gas flows through a diffuser 38 in which the gas is decelerated and compressed, after which it is exhausted into the ambient atmosphere. The gas deceleration and compression maintains the laser gas pressure at the downstream end of the excitation region 26 slightly below the ambient atmospheric pressure during laser operation.

Figure 2:
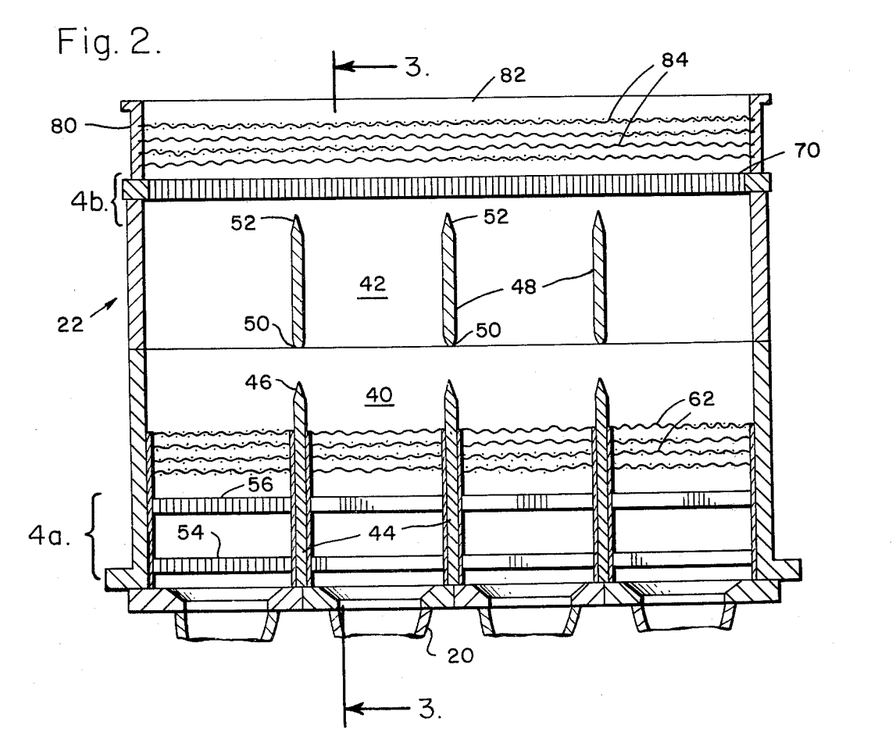
FIG. 2 is a longitudinal sectional view taken along line 2—2 of FIG. 1 and illustrating the plenum chamber and nozzle portions of the gas flow system for the laser of FIG. 1.
Figure 3:
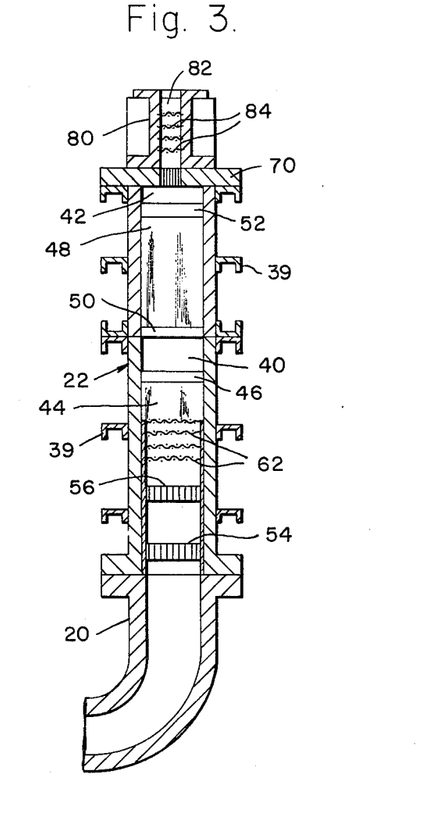
FIG. 3 is a cross-sectional view taken along line 3—3 of FIG. 2.

The plenum chamber portion of the gas flow system for the laser of FIG. 1 is shown in more detail in FIGS. 2 and 3. As was mentioned above, the laser gas is delivered at high pressure to the plenum chamber 22 via a plurality of supply lines 20. The purpose of the plenum chamber 22 is to smooth nonuniformities and turbulence in the gas flow produced in the supply lines 20 and to merge the plurality of gas streams into a single smooth stream. As a specific example for illustrative purposes, the laser gas may be delivered to the plenum chamber 22 at a mass flow of 16 lbs./sec. and the gas pressure within the plenum chamber 22 maintained at around ten atmospheres or higher. Thus, in order to enhance structural strength and rigidity, a plurality of elongated reinforcing ribs 39 may be secured to the outer surfaces of the longitudinal walls of the plenum chamber 22 along a direction parallel to the laser beam axis 36, i.e. perpendicular to the direction of gas flow.

In a preferred embodiment of the invention the plenum chamber 22 is constructed in two sections: a lower section 40 which performs primarily a gas spreading and turbulence damping function, and an upper section 42 which performs primarily a settling and mixing function. Both plenum chamber sections 40 and 42 have an elongated rectangular cross-section, which may be 12.7 cm × 125 cm, for example. A plurality of partitioning fins 44 disposed parallel to the direction of gas flow divide the lower plenum chamber section 40 into a plurality of gas flow regions for the respective streams from the various supply pipes 20. The fins 44 terminate below the upper end of the plenum chamber section 40 to permit mixing of the several gas streams and are provided with tapered end portions 46 to facilitate smoothing and mixing of the flow. The upper plenum chamber section 42 is also provided with a plurality of partitioning fins 48 aligned with respective fins 44. The fins 48 have rounded end portions 50 adjacent to the lower plenum chamber section 40 and tapered end portions 52 at their opposite ends to further facilitate smoothing and mixing of the flow.

The flow smoothing function of the plenum chamber 22 is performed by a series of obstructions disposed in the path of the flowing gas, starting with coarse obstructions at the upstream end of the chamber 22 and gradually increasing the fineness of the obstructions along the direction of the flow. For this purpose a first perforated plate 54 is disposed across the plenum chamber section 40 in a plane perpendicular to the direction of gas flow just beyond the gas entrance region, and a second perforated plate 56 is disposed across the chamber section 40 parallel to and slightly downstream from the first plate 54. The first perforated plate 54, which has a porosity greater than that of second plate 56, creates a severe obstruction which reduces the gas flow velocity, thereby smoothing the flow. The second perforated plate 56 further smooths the flow and protects further obstructions downstream from the plates 54 and 56 from the blast from the first plate 54.

Figure 4A:
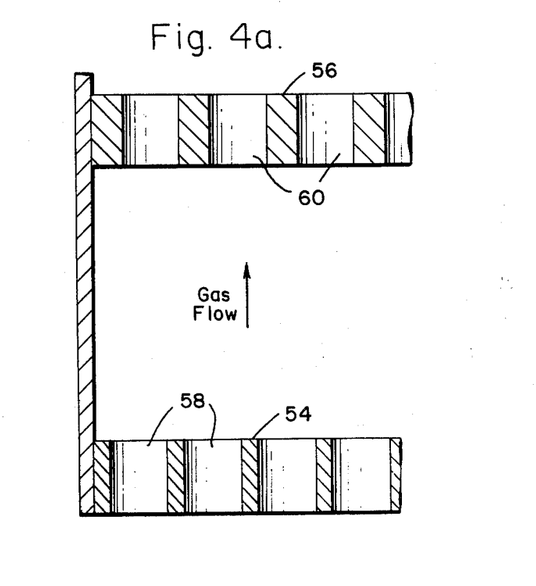
FIGS. 4a and 4b are enlarged illustrations of portions of the plenum chamber and nozzle, respectively, shown in FIG. 2.

As is shown in FIG. 4a, plate 54 defines a plurality of cylindrical holes 58 therethrough, while plate 56 similarly defines a plurality of cylindrical holes 60 therethrough. Preferably, the holes 58 and 60 are of the same diameter, and the greater porosity for the plate 54 is achieved by locating the holes in plate 54 closer together than the holes 60 in plate 56. As a specific example, each of the holes 58 and 60 may be ¼ inch in diameter; however, whereas the center of each hole 58 would be located at the vertex of an equilateral triangle of side 5/16 inch, the center of each hole 60 would be located at the vertex of an equilateral triangle of side ⅜ inch. This results in a porosity of 52% for the first plate 54 and a porosity of 43% for the second plate 56. It is pointed out that the foregoing specific values are included solely for illustrative purposes, and other hole sizes and plate porosities also may be employed.

Fine smoothing of the gas flow may be achieved by a series of turbulence damping screens 62 disposed across plenum chamber section 40 parallel to and slightly downstream from the second perforated plate 56. Different ones of the screens 62 may have a different mesh size, with the finer screens being located downstream from the coarser ones. As a specific example for illustrative purposes, a total of four screens 62 may be employed, with the two screens nearest the plate 56 constructed of twenty mesh, 0.016 inch diameter wire (a porosity of 46%) and the two screens nearest plenum chamber section 42 constructed of 30 mesh, 0.013 inch diameter wire (a porosity of 37%).

Disposed at the downstream end of the plenum chamber 22 is a perforated plate nozzle 70 which converts the high-pressure laser gas in the plenum chamber 22 into a smoothly and uniformly flowing gas stream which arrives at the laser excitation region 26 with the desired subsonic velocity and gas pressure to satisfy the gas dynamic relationships necessary for efficient laser operation. For efficient laser operation at atmospheric pressure, the dimensions of the laser excitation region 26 and the gas flow velocity therethrough must be carefully selected to maintain high optical gain across the excitation region 26. If the gas flow velocity is too slow, excessive heating will occur causing a reduction in laser efficiency. If the gas flow velocity is too high, sufficient energy cannot be introduced into the excitation region 26 without causing flow instability. Specifically, it has been found that for optimum operation of the laser of FIG. 1, with the electron beam from the gun 28 turned on, the gas should enter the excitation region 26 at a velocity of about Mach 0.4 and a pressure of about 1.1 atmospheres.

Figure 4B:
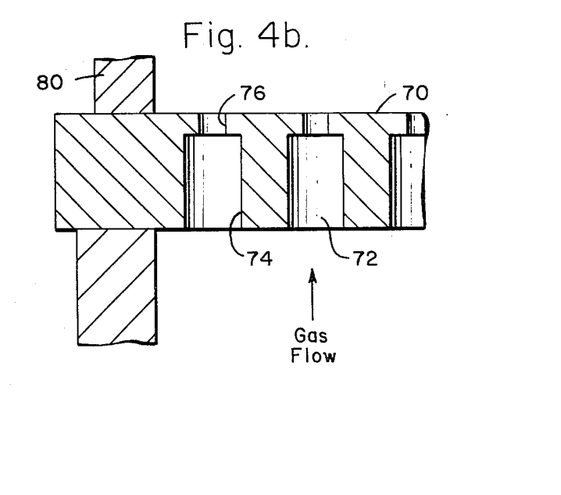

The perforated plate nozzle 70 is shown in more detail in FIG. 4b. The nozzle 70 consists of a plate, of a material such as stainless steel, provided with an array of countersunk cylindrical holes 72 therethrough, preferably arranged in rows and columns. Each hole 72 has a larger diameter bore 74 at its upstream (plenum chamber) end and a coaxial smaller diameter bore 76 at its downstream (flow channel) end. As shown, the larger diameter bores 74 extend through most of the length of the holes 72. As a specific example for illustrative purposes, the nozzle plate may have a thickness of 1.5 inch, the larger bores 74 a diameter of 0.25 inch, the smaller bores 76 a diameter of 0.1 inch, and the centers of adjacent holes 72 may be spaced by 0.4 inch. This results in a porosity for the nozzle 70 of about 5%.

In operation of the perforated plate nozzle, the gas attains sonic velocity (Mach 1) inside the bores 76 in plate 70. A short distance downstream from plate 70, the gas flowing through each bore 76 expands to supersonic velocity as a free jet (plume). The flow then decelerates to subsonic velocity through a series of shock waves, and the individual jets coalesce into a uniform subsonic stream.

In contrast, in a conventional Laval nozzle having divergent nozzle walls, the gas flowing through the nozzle reaches supersonic velocity within the nozzle. Lateral expansion of the gas is constrained by the nozzle walls, and when operated in an overexpanded condition, the flow tends to separate from the walls in the form of vortices and eddies. Thus, the ability to achieve a smooth homogenous flow is severely impaired, if not precluded. On the other hand, with the perforated plate nozzle 70, the flow expands to supersonic velocity as a free jet downstream from the nozzle 70. Thus, expansion and compression of the jets is not restricted, and smooth homogenous flow is achieved.

A housing 80 attached to the downstream side of nozzle plate 70 defines a first portion 82 of gas flow channel 24. The gas flow channel 24 has an elongated rectangular cross-section (4.2 cm × 125 cm, for example) smaller than that of the plenum chamber 22. A series of turbulence damping screens 84 may be disposed across flow channel portion 82 perpendicular to the direction of gas flow to insure that any turbulence introduced by the nozzle 70 will be removed before the gas enters the discharge region 26. As a specific example for illustrative purposes, a total of four screens 84 may be employed, with each screen constructed of twenty mesh, 0.016 inch diameter wire (a porosity of 46%). Flow channel portion 82 may also include a channel high reducing section to further reduce flow boundary layers in excitation region 26.

The laser gas then flows through the excitation cavity portion of flow channel 24 including excitation region 26 where it is excited by the electric current initiated by the transversely flowing electron beam from electron gun 28. The electron gun 28 and the excitation cavity portion of flow channel 24 will be discussed in greater detail below in connection with FIGS. 6–10. However, for purposes of the present discussion concerning the gas flow system, it should suffice to state that the electric current deposits energy into the gas, thereby progressively heating the gas. This results in acceleration of the gas and a decrease in gas pressure as the gas flows through the excitation region 26. As a specific example in connection with a laser constructed with the aforementioned exemplary parameter values, the gas may enter the excitation region 26 at a temperature of about 280°K, a velocity of about Mach 0.4, and a pressure of about 1.1 atmospheres. However, as a result of the electric current, the gas leaves the region 26 at a temperature of about 460°K, a velocity of about Mach 0.7, and a pressure of about 0.8 atmosphere.

Figure 5:
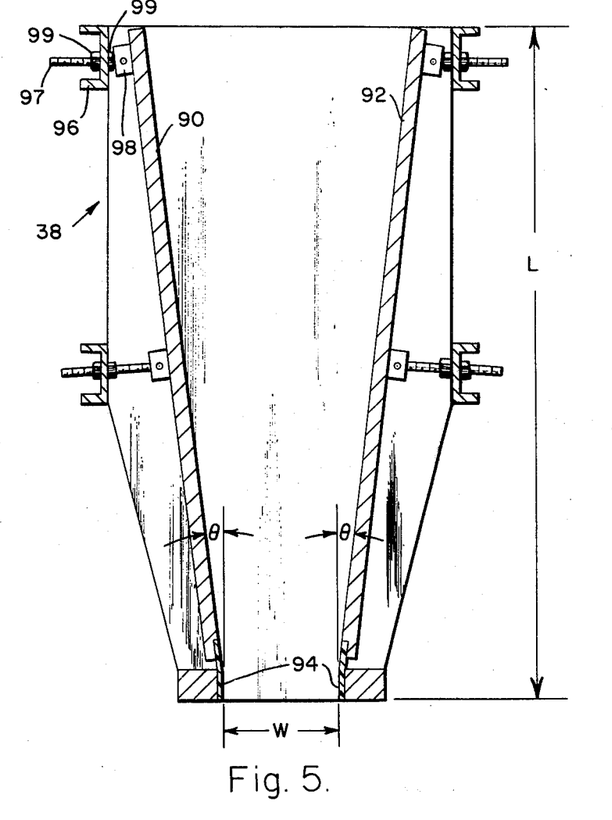
FIG. 5 is a cross-sectional view taken along line 5—5 of FIG. 1 and illustrating the diffuser portion of the laser gas flow system.

Since the static pressure in a subsonic jet adjusts itself to match the ambient pressure at the exit of the jet channel, exhaust diffuser 38 is provided downstream from the laser excitation region 26 to condition the gas such that the desired gas flow velocity and gas pressure are achieved at the downstream end of the excitation region 26. As is shown in FIG. 5, the exhaust diffuser 38 is provided with a pair of sidewall members 90 and 92 oriented to diverge outwardly at an angle $\theta$ with respect to the gas flow direction, thereby forming a divergent duct which decelerates and compresses the gas. The diffuser sidewall members 90 and 92 are adjustably mounted to permit operation of the diffuser 38 over a range of diverging angles $\theta$. This enables the diffuser inlet gas pressure and flow velocity to be optimized for maximum laser efficiency even when the ambient pressure departs from atmospheric pressure. Thus, efficient laser operation may be achieved over a range of ambient pressure conditions.

Adjustable mounting of the diffuser sidewall members 90 and 92 may be achieved by mounting the wall members 90 and 92 on hinge joints 94 at the bottom of the diffuser 38 and attaching the members 90 and 92 to longitudinally extending support ribs 96 on the diffuser frame by means of threaded tension bolts 97. The bolts 97 are attached to clevis joints 98 on the wall members 90 and 92 and held in the desired position by means of locking nuts 99.

For a laser constructed with the aforementioned specific exemplary parameter values, it has been found that optimum performance of the diffuser 38 may be achieved by making the ratio of diffuser length L to inlet width W equal to fifteen and (for an ambient pressure of one atmosphere) employing a diverging angle $\theta$ of 3.5°. However, other diffuser parameter values are also suitable. Moreover, although it is preferred to operate the diffuser 38 with both wall members 90 and 92 oriented at the same diverging angle $\theta$, slightly different diverging angles may be utilized for the respective wall members 90 and 92.

Figures 6, 10:
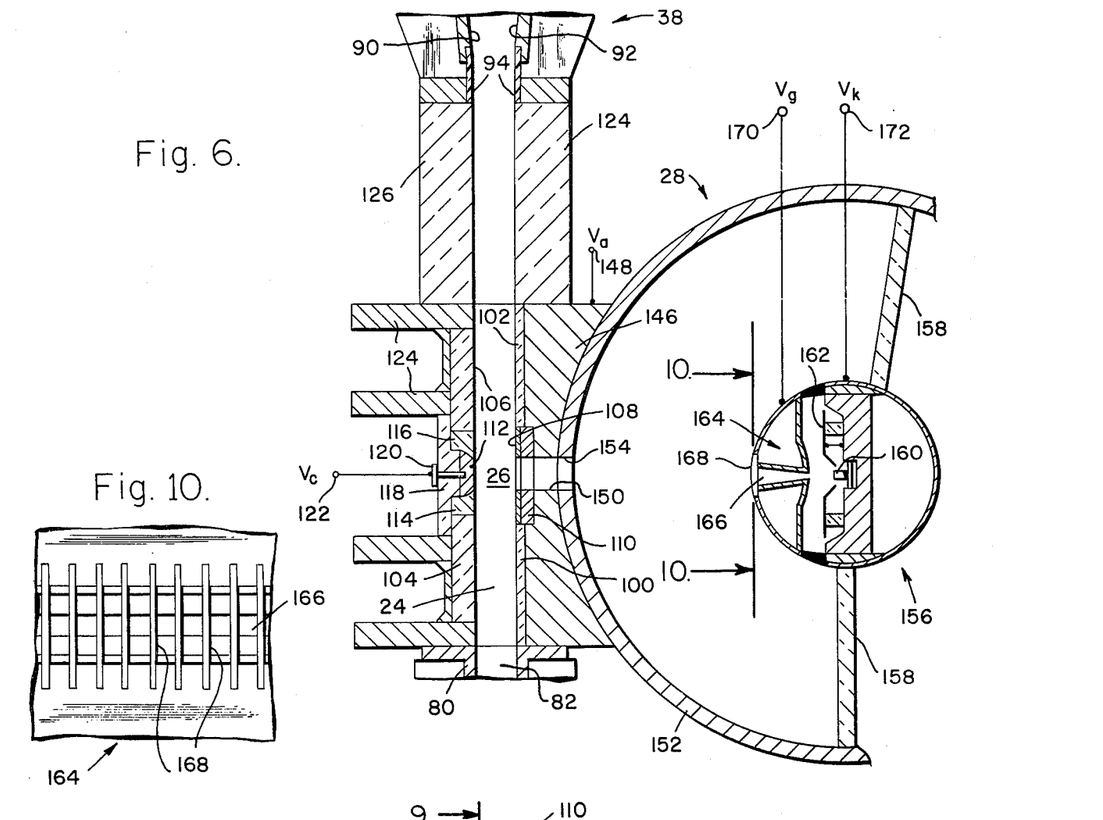
FIG. 6 is a cross-sectional view taken along line 6—6 of FIG. 1 and illustrating the electron gun and the flow channel portion of the gas flow system including the excitation region.
FIG. 10 is a plan view showing a portion of the grid structure for the electron gun of FIG. 6 as seen along line 10—10.

The laser cavity portion of the gas flow channel 24, including excitation region 26 where the laser gas is excited to a condition of population inversion, is shown in more detail in FIG. 6. This portion of the flow channel 24 has a pair of aligned spaced wall members 100 and 102 on the electron gun side of the channel and a pair of aligned spaced wall members 104 and 106 on the opposite side. The wall members 100, 102, 104 and 106 may be of an insulating material such as glass ceramic. An electron beam window element 108 is mounted on a support member 110 between the wall members 100 and 102 adjacent to excitation region 26 such that the outer surface of window element 108 lies flush with the channel wall provided by members 100 and 102. The window element 108 and its support member 110 will be described in greater detail below with reference to FIGS. 7, 8 and 9. However, for the present it should suffice to state that the window element 108 enables electrons from electron gun 28 to enter the excitation region 26 with the desired velocity while at the same time allowing the appropriate pressure differential to be maintained between the excitation region 26 and the interior of the electron gun 28. In addition, the window element 108 serves as an anode for the electrical current that is maintained across region 26.

Mounted between flow channel wall members 104 and 106 on the opposite side of excitation region 26 from the window element 108 is a cold cathode 112. An example of a specific combination of materials which may be used for the cathode 112 is an aluminum base provided with respective coatings of molybdenum, $B_4C$ and $Al_2O_3$, although it should be understood that other cathode materials are also suitable. Insulating members 114 and 116 are disposed between cathode 112 and channel wall members 104 and 106, respectively, to fill the space resulting from the cathode profile and provide a smooth continuous gas flow channel wall. An insulating cap member 118 is mounted behind cathode 112, and electrical connection to cathode 112 is afforded by means of a pin 120 extending through cap member 118 into contact with cathode 112. Pin 120 is, in turn, electrically connected to a power supply terminal 122 which furnishes the desired DC operating voltage $V_c$ for the cathode 112.

A plurality of strut members 124 extend outwardly from the channel wall members 104 and 106 to provide additional strength and rigidity for the flow channel. In addition, a pair of flow channel wall members 124 and 126 of insulating material are provided above and substantially aligned with respective channel wall members 102 and 106 to extend the gas flow channel 24 to the region of the diffuser 38. Channel wall members 126 have respective broad surfaces in substantial continuity with the broad surfaces of diffuser sidewall members 92 and 90, respectively.

Figure 7:
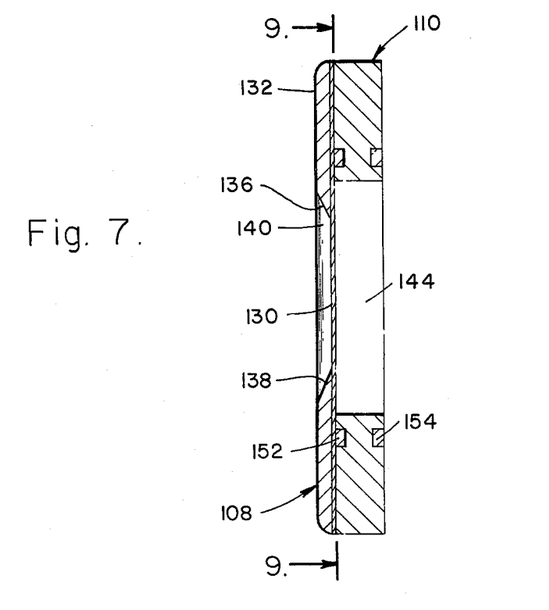
FIG. 7 is an enlarged cross-sectional view of the electron beam window element and window support member shown in FIG. 6.
Figure 8:
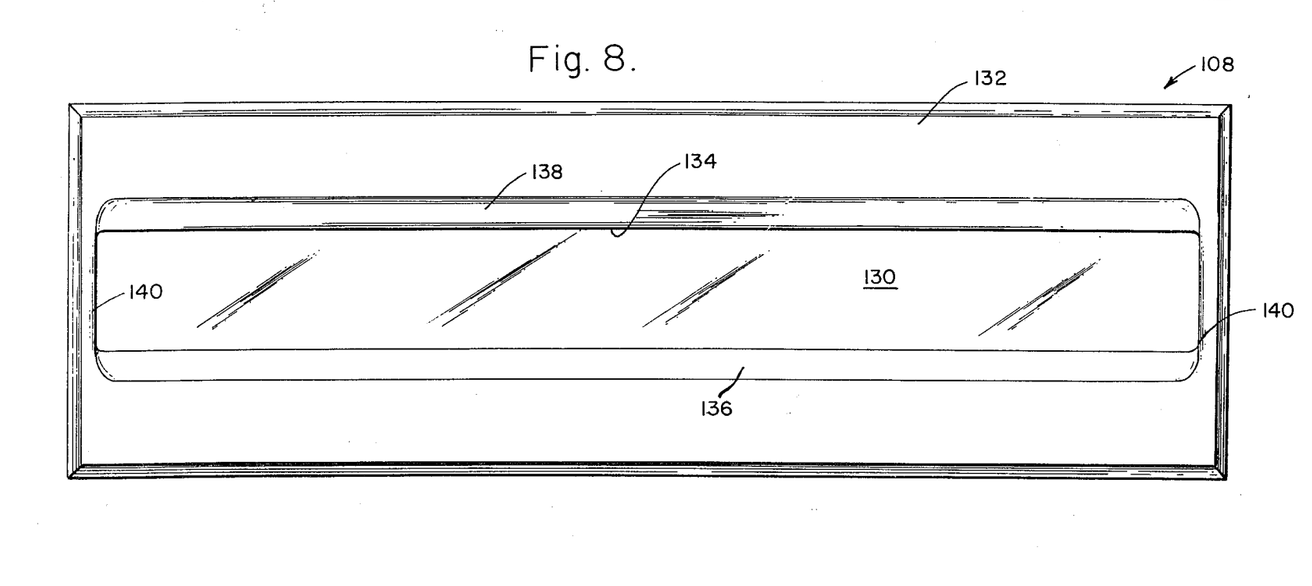
FIG. 8 is a longitudinal plan view of the electron beam window element.
Figure 9:
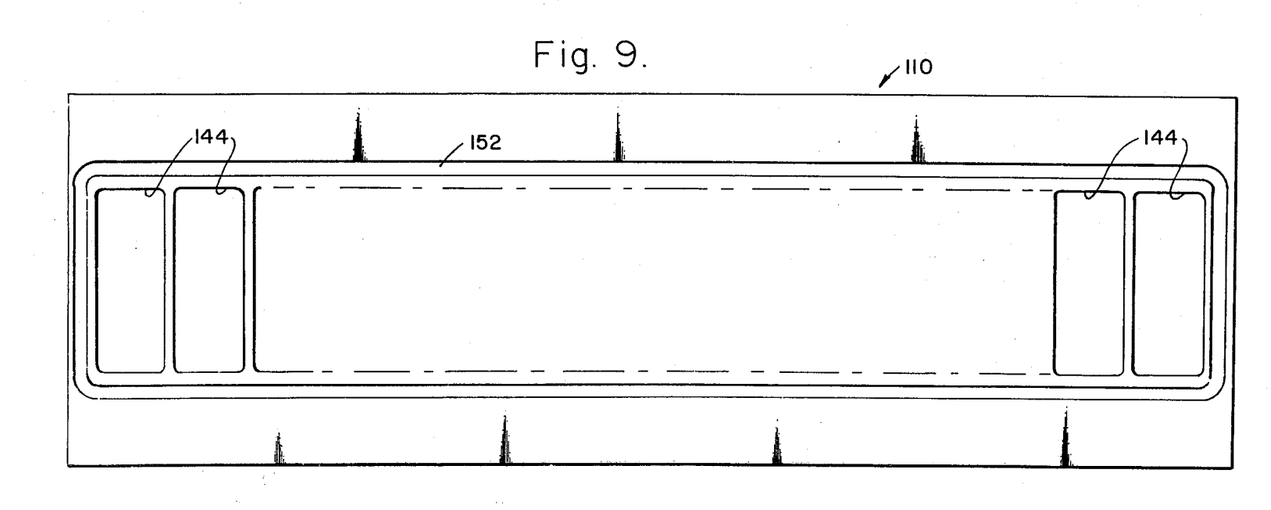
FIG. 9 is a longitudinal plan view of the window support member as taken along line 9—9 of FIG. 7.

The electron beam window element 108 is shown in more detail in FIGS. 7 and 8. Window element 108 consists of a thin metallic foil 130 bonded to the back surface of a frame member 132. The metallic foil 130 may be of 0.0005 inch thick titanium, for example. The frame member 132 defines an elongated substantially rectangular aperture 134 through which the foil 130 is exposed to the flowing laser gas. The member 132 further defines tapered portions 136 and 138 adjacent to the longitudinal edges of the aperture 134 and rounded portions 140 and 142 adjacent to the transverse edges of the aperture 134 to facilitate smooth, uniform gas flow directly over the exposed surface of the foil 130. By exposing the surface of window foil 130 to the flowing laser gas as described above, the foil 130 is able to be cooled by the flowing laser gas itself. This not only provides superior and more uniform cooling of the window surface, resulting in longer window life, but it also eliminates the need for special window cooling apparatus.

The window element 108 is mounted, for example by bolts (not shown), on support member 110 (FIGS. 7 and 9) which may be of stainless steel, for example. The window support member 110 has an outer length and width the same as those of the window element 108 but a thickness substantially greater than that of the window element 108. Moreover, window support member 110 defines a series of like substantially rectangular apertures 144 having their longitudinal dimension disposed perpendicular to the longitudinal dimension of aperture 134 in window frame member 132, with the apertures 144 having a longitudinal extent slightly greater than the lateral extent of frame member aperture 134. This enables window support member 110 to also function as an accelerating and focusing grid for the electron beam generated by electron gun 28.

As shown in FIG. 6, window support member 110 is mounted in an extension 146 of the housing for the electron gun 28. Housing extension 146 is electrically connected to a power supply terminal 148 which furnishes the desired DC operating voltage $V_a$ (which may be ground, for example) for the anode foil 130. Also, housing extension 146 defines an elongated aperture 150 substantially aligned with the perimeter of the array of apertures 144 in window support member 110 to provide a passage for the generated electron beam. In order to insure that the desired pressure differential will be maintained between the discharge region 26 and the interior of the electron gun 28, O-rings 152 and 154 (FIG. 7) may be mounted in respective recesses in member 110 surrounding the apertures 144 and facing the window element 108 and the housing extension 146, respectively.

The electron gun 28 is illustrated in more detail in FIGS. 6 and 10. As a specific example for purposes of illustration, the electron gun 28 may be designed to provide at the surface of window element 108 a uniform electron beam having a cross-section of 5 cm × 125 cm with a current density of less than about 100 $\mu a/cm^2$. The electron gun 28 is contained within a tubular outer housing 152, which may be of stainless steel, for example, and which is secured to extension 146. Housing 152 defines an elongated aperture 154 aligned with aperture 150 in extension 146 to provide a passage for the generated electron beam. The interior of the electron gun housing 152 is evacuated to a desired operating pressure, for example $5 \times 10^{-5}$ Torr or lower.

A cylindrical inner electron gun assembly 156 is coaxially mounted within gun housing 152, for example by means of a plurality of ceramic supports 158. The inner assembly 156 is, for example, a Pierce-type electron gun and includes an elongated indirectly heated cathode 160 aligned with electron gun aperture 154. The cathode 160 may consist of a series of segments of porous tungsten impregnated with barium oxide, for example. A Pierce-type focusing electrode 162, maintained at cathode potential, is disposed adjacent to the cathode 160. Disposed at the front of the assembly 156 between the cathode 160 and the electron gun aperture 154 is a beam-expanding electrode array 164 which provides a diverging drift region 166 for the emitted electrons. The drift region 166 is designed to produce sufficient lateral expansion of the electron beam so that when the beam arrives at window element 108 the entire width of the window aperture 134 is illuminated. Beam-expanding electrode array 164 is provided with a series of transverse bar grid elements 168 across the exit aperture from the drift region 166 to provide high voltage electric field control. Electrode array 164 is connected to a power supply terminal 170 providing a DC operating voltage $V_g$, while cathode 160 is connected to a power supply terminal 172 providing a DC operating voltage $V_k$. Electrical leads to the cathode 160 and to the electrode array 164 may be brought out of the electron gun housing 152 through an end wall of the housing 152, along with a further lead to the cathode heater (not shown).

The following exemplary operating potentials may be employed for the aforedescribed laser, although it should be understood that other operating potentials are also appropriate.

$V_c = -12$ Kv
$V_a = 0$
$V_g = -149.5$ Kv
$V_k = -150$ Kv.

In the operation of the laser described above, the gas flow system is first activated, causing the laser gas to flow through the plenum chamber 22, the gas flow channel 24 and the diffuser 38. The electron gun operating voltages $V_k$ and $V_g$ are then turned on, causing the electron gun 28 to emit an electron beam which passes through window element 108 into excitation region 26 of the gas flow channel 24. The supply voltage $V_c$ is then turned on, commencing an electric current across region 26 between foil anode 108 and cathode 112 which excites the laser gas so as to produce a cw laser output beam. After the laser beam has been maintained for the desired length of time, the supply voltage $V_c$ is turned off, thereby terminating the laser output. The electron gun voltages $V_g$ and $V_k$ are then turned off, after which the gas flow is stopped.

As will be apparent, a laser according to the invention is able to provide high power cw laser energy. In addition, the laser possesses numerous advantages over prior art lasers of comparable power output.

The plenum chamber-nozzle arrangement simply and effectively converts high-pressure supplied laser gas into a smooth, uniform, subsonic flow. This reduces the overall volume of the laser by allowing it to be fed by compact, high-pressure storage tanks.

Also, the sonic perforated plate nozzle provides gas dynamic isolation between the plenum chamber and the discharge region, so that the mass flow rate of the laser gas is independent of the amount of energy added to the gas by the electric discharge. This simplifies operation of the laser, especially during the transient period immediately after the excitation current is commenced.

In addition, the exhaust diffuser enables the static pressure at the downstream end of the excitation region to be slightly lower than the ambient pressure. This increases the laser efficiency and provides a measure of independence from ambient pressure conditions.

Further, the gas flow system can be open cycle, i.e., the laser gas is exhausted into the ambient atmosphere after passing once through the laser discharge region. This eliminates the need for pumps, heat exchangers and other gas circulation equipment.

Moreover, components such as the electron beam window foil are cooled by the flowing laser gas itself, thereby eliminating the need for special cooling apparatus.

Additionally, the laser is capable of excitation from simple and straightforward power supplies.

In summary, the present invention provides a high power electric discharge flowing gas laser that is smaller, lighter, less complex, more economical and operates efficiently over a wider optical bandwidth than prior art lasers of comparable power output.

Although the present invention has been shown and described with reference to a particular embodiment, nevertheless various changes and modifications obvious to a person skilled in the art to which the invention pertains are deemed to lie within the spirit, scope and contemplation of the invention.

What is claimed is:

1. A high power electrically excited flowing gas laser comprising in combination:
   gas supply means including a plenum chamber for supplying a laser gas at a pressure substantially greater than atmospheric pressure;
   means defining a gas flow channel including an excitation region for said laser gas;
   means for introducing a cw electron beam into said excitation region in a direction perpendicular to the direction of gas flow and for applying a cw DC electric field across said excitation region in a direction parallel to the direction of said electron beam to provide an electric current sufficient to excite said laser gas to a condition of population inversion;
   nozzle means disposed between said plenum chamber and said gas flow channel and spaced from said excitation region for controlling the flow velocity of said laser gas in said flow channel such that said laser gas enters said excitation region at a predetermined subsonic velocity maximizing laser efficiency without causing gas flow instability and at a pressure slightly greater than atmospheric pressure;
   diffuser means in gas flow communication with the downstream end of said flow channel and with the ambient atmosphere for decelerating and compressing said laser gas before exhausting into the ambient atmosphere such that said laser gas leaves said excitation region at a pressure slightly less than atmospheric pressure; and
   optical resonator means in optical communication with said excitation region and having an optical axis passing through said excitation region in a direction perpendicular to both the gas flow and electron beam directions for providing a cw laser beam along said axis.

2. A laser according to claim 1 wherein said gas supply means includes first and second perforated plates disposed across said plenum chamber in respective planes substantially perpendicular to the direction of gas flow through said plenum chamber, said second plate being located downstream from said first plate, each of said plates defining an array of gas flow passages therethrough such that said first plate has a porosity greater than that of said second plate.

3. A laser according to claim 2 wherein said nozzle means includes a third perforated plate defining an array of gas flow passages therethrough such that said third plate has a porosity substantially less than that of said second plate.

4. A laser according to claim 1 wherein said nozzle means includes a perforated plate defining an array of gas flow passages therethrough of varying cross-section and having their smallest cross-section at the downstream edge of said plate.

5. A laser according to claim 4 wherein said gas flow passages are cylindrical bores through said plate, said cylindrical bores having a larger diameter portion extending through most of the bore length and a smaller diameter portion downstream from the larger diameter portion and extending for the remainder of the bore length.

6. A laser according to claim 1 wherein said laser gas enters said excitation region at a pressure of about 1.1 atmospheres.

7. A laser according to claim 6 wherein said laser gas leaves said excitation region at a pressure of about 0.8 atmosphere.

8. A laser according to claim 1 wherein said laser gas enters said excitation region at a velocity of about Mach 0.4.

9. A laser according to claim 8 wherein said laser gas leaves said excitation region at a velocity of about Mach 0.7.

10. A laser according to claim 1 wherein said laser gas enters said excitation region at a temperature of about 280°K and leaves said excitation region at a temperature of about 460°K.

11. A laser according to claim 1 wherein said laser gas enters said excitation region at a velocity of about Mach 0.4, a pressure of about 1.1 atmospheres, and a temperature of about 280°K; and said laser gas leaves said excitation region at a velocity of about Mach 0.7, a pressure of about 0.8 atmosphere, and a temperature of about 460°K.

12. A laser according to claim 1 wherein said laser gas consists of a mixture of helium, nitrogen and carbon dioxide in a volume ratio of approximately 8:7:1, respectively.

* * * * *